United States Patent
Yang et al.

(10) Patent No.: US 8,513,922 B2
(45) Date of Patent: Aug. 20, 2013

(54) BATTERY PACK AND METHOD OF CONTROLLING CHARGING OF BATTERY PACK

(75) Inventors: Jong-Woon Yang, Yongin-si (KR); Susumu Segawa, Yongin-si (KR); In-Kyu Park, Yongin-si (KR); Tetsuya Okada, Yongin-si (KR); Jin-Wan Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 295 days.

(21) Appl. No.: 12/926,405

(22) Filed: Nov. 16, 2010

(65) Prior Publication Data

US 2011/0121789 A1 May 26, 2011

(30) Foreign Application Priority Data

Nov. 20, 2009 (KR) .................. 10-2009-0112808

(51) Int. Cl.
*H02J 7/04* (2006.01)
*H02J 7/00* (2006.01)

(52) U.S. Cl.
USPC ........... 320/152; 320/116; 320/118; 320/119; 320/134

(58) Field of Classification Search
USPC .................................. 320/152, 116, 118–119
See application file for complete search history.

(56) References Cited

U.S. PATENT DOCUMENTS

| 6,377,429 | B1 | 4/2002 | Descombes |
| 7,193,391 | B2* | 3/2007 | Moore ............... 320/116 |
| 8,173,287 | B2* | 5/2012 | Sim ................... 429/92 |
| 8,288,993 | B2* | 10/2012 | Shiu et al. ............ 320/122 |
| 2001/0011881 | A1* | 8/2001 | Emori et al. ........... 320/116 |
| 2003/0141843 | A1* | 7/2003 | Anzawa et al. ......... 320/118 |
| 2007/0024246 | A1* | 2/2007 | Flaugher .............. 320/150 |
| 2007/0108940 | A1 | 5/2007 | Sainomoto et al. |
| 2009/0071675 | A1 | 3/2009 | Hanawa et al. |
| 2010/0046123 | A1* | 2/2010 | Fukami ............... 361/18 |
| 2010/0194339 | A1* | 8/2010 | Yang et al. ............ 320/116 |

FOREIGN PATENT DOCUMENTS

| JP | 06-205542 A | 7/1994 |
| JP | 2000-121710 A | 4/2000 |
| JP | 2000-341866 A | 12/2000 |
| JP | 2006-170808 A | 6/2006 |
| JP | 2007-143284 A | 6/2007 |
| JP | 2007-234264 A | 9/2007 |

OTHER PUBLICATIONS

Korean Office Action in KR 10-2009-0112808, dated Mar. 31, 2011 (Yang, et al.).
Korean Notice of Allowance in KR 10-2009-0112808, dated Oct. 31, 2011 (Yang, et al.).

* cited by examiner

*Primary Examiner* — M'Baye Diao
(74) *Attorney, Agent, or Firm* — Lee & Morse, P.C.

(57) ABSTRACT

A battery pack includes a battery cell, a charge-blocking unit, a voltage sensing and balancing circuit, and a microcomputer, the microcomputer including a controller that detects at least one selected from the group of abnormal analog-to-digital conversion, abnormal voltage, and abnormal temperature of the battery cell, the controller outputting a charge control signal to the charge-blocking unit to inhibit charging of the battery cell.

14 Claims, 5 Drawing Sheets

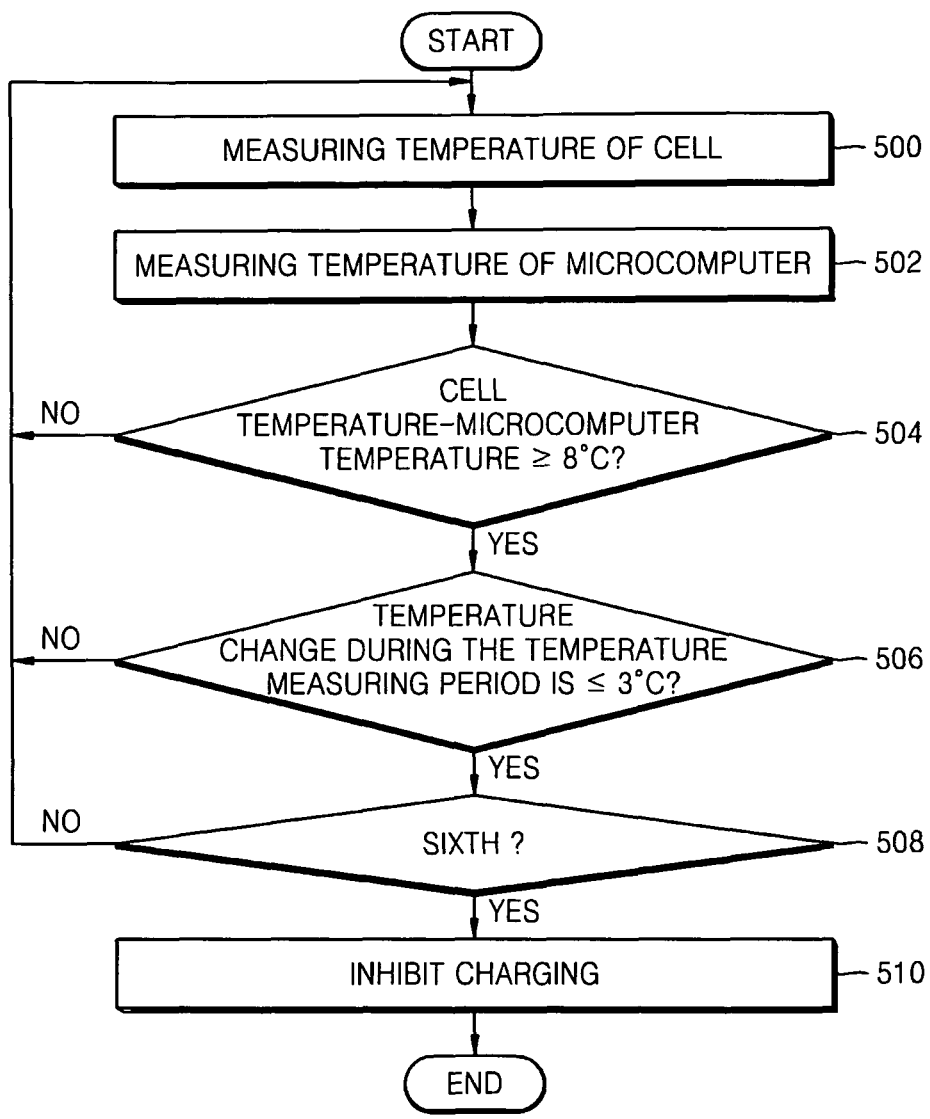

BATTERY PACK AND METHOD OF CONTROLLING CHARGING OF BATTERY PACK

BACKGROUND

1. Field

Embodiments relate to a battery pack and a method of controlling charging of the battery pack.

2. Description of the Related Art

Electric power tools, such as drills, may operate using a motor powered via a power cord plugged into a commercial power source, e.g., mains or house wiring. However, recently, portable electric power tools suitable for long term use using batteries instead of a power cord have been commercialized.

SUMMARY

It is a feature of an embodiment to provide a battery pack that may inhibit charging of the battery pack for safe and effective operation.

It is another feature of an embodiment to provide a method of controlling charging of the battery pack.

At least one of the above and other features and advantages may be realized by providing a battery pack, including a battery cell, a charge-blocking unit, a voltage sensing and balancing circuit, and a microcomputer, the microcomputer including a controller configured to detect at least one selected from the group of abnormal analog-to-digital conversion, abnormal voltage, and abnormal temperature of the battery cell, the controller configured to output a charge control signal to the charge-blocking unit to inhibit charging of the battery cell.

The microcomputer may further include an analog-to-digital (A/D) converter that converts analog voltage, temperature, and current measurements from the battery cell into digital output values, and the controller may output a charge control signal to the charge-blocking unit if the difference between a measurement value obtained by inputting a voltage of a zener diode to the A/D converter and a reference value recorded during an initial test of the microcomputer is equal to or greater than a first threshold.

The battery pack may include a plurality of battery cells, and the controller may output a charge control signal to the charge-blocking unit if a difference between a sum of voltages of the plurality of battery cells and a voltage of the battery pack is equal to or greater than a second threshold.

The microcomputer may further include a current measuring unit, and the controller may output a charge control signal to the charge-blocking unit if the difference between the sum of voltages of each of the plurality of battery cells and the voltage of the battery pack is equal to or greater than a second threshold, and the measured current is equal to or less than a third threshold.

The microcomputer may further include a temperature measuring unit for measuring the temperature of the microcomputer, and the controller may output a charge control signal to the charge-blocking unit if a difference between the temperature of the battery cell and the temperature of the microcomputer is equal to or greater than a fourth threshold.

The controller may output a charge control signal to the charge-blocking unit if the difference between the temperature of the battery cell and the temperature of the microcomputer is equal to or greater than the fourth threshold, and a temperature change within a time period during which the temperature is measured is equal to or less than a fifth threshold.

The controller may detect, at least twice, at least one selected from the group of abnormal analog-to-digital conversion of the microcomputer, abnormal voltage, and abnormal temperature of the battery cells.

The charge-blocking unit may include a fuse disposed between the battery cell and a charging terminal for inhibiting overcharge, a heating resistor for blowing the fuse, and a switch that is turned on or off according to the charge control signal output by the controller.

The battery pack may be an electric power tool battery pack.

At least one of the above and other features and advantages may also be realized by providing a method of controlling charge of a battery pack that includes a battery cell, a charge-blocking unit, a voltage sensing and balancing circuit, and a microcomputer, the method including detecting at least one selected from the group of abnormal analog-to-digital conversion of the microcomputer, abnormal voltage, and abnormal temperature of the battery cell, outputting a charge control signal to the charge-blocking unit according to the detected abnormality, and inhibiting charging of the battery pack according to the charge control signal.

The detecting may include measuring an analog-to-digital conversion value by inputting a voltage of a zenor diode to an analog-to-digital (A/D) converter, determining whether a difference between the measured value and a reference value recorded during an initial test of the microcomputer is equal to or greater than a first threshold, and outputting a charge control signal to the charge-blocking unit if the difference is equal to or greater than the first threshold.

The battery pack may include a plurality of battery cells, and the detecting may include measuring a voltage of each of the battery cells and a voltage of the battery pack, determining whether a difference between a sum of the voltages of each of the battery cells and the voltage of the battery pack is equal to or greater than a second threshold, and outputting a charge control signal to the charge-blocking unit if the difference is equal to or greater than the second threshold.

The detecting may further include measuring a current of the battery pack, and the outputting may include outputting a charge control signal to the charge-blocking unit if the difference is equal to or greater than the second threshold and the measured current is equal to or less than a third threshold.

The detecting may further include measuring a temperature of the battery cell and a temperature of the microcomputer, determining whether the difference between the temperature of the battery cell and the temperature of the microcomputer is equal to or greater than a fourth threshold, and outputting a charge control signal to the charge-blocking unit if the difference is equal to or greater than the fourth threshold.

The detecting may further include calculating a temperature change for a time period during which the temperature is measured if the difference is equal to or greater than the fourth threshold, and the outputting may include outputting a charge control signal to the charge-blocking unit if the temperature change is equal to or less than a fifth threshold.

The detecting may further include performing, at least twice, the detecting of at least one selected from the group of abnormal analog-to-digital conversion of the microcomputer, abnormal voltage, and abnormal temperature of the battery cells.

The battery pack may be an electric power tool battery pack.

BRIEF DESCRIPTION OF THE DRAWINGS

The above and other features and advantages will become more apparent to those of skill in the art by describing in detail example embodiments with reference to the attached drawings, in which:

FIG. 5 illustrates a flowchart describing a method of controlling charge of a battery pack according to another embodiment.

DETAILED DESCRIPTION

Figure 1:
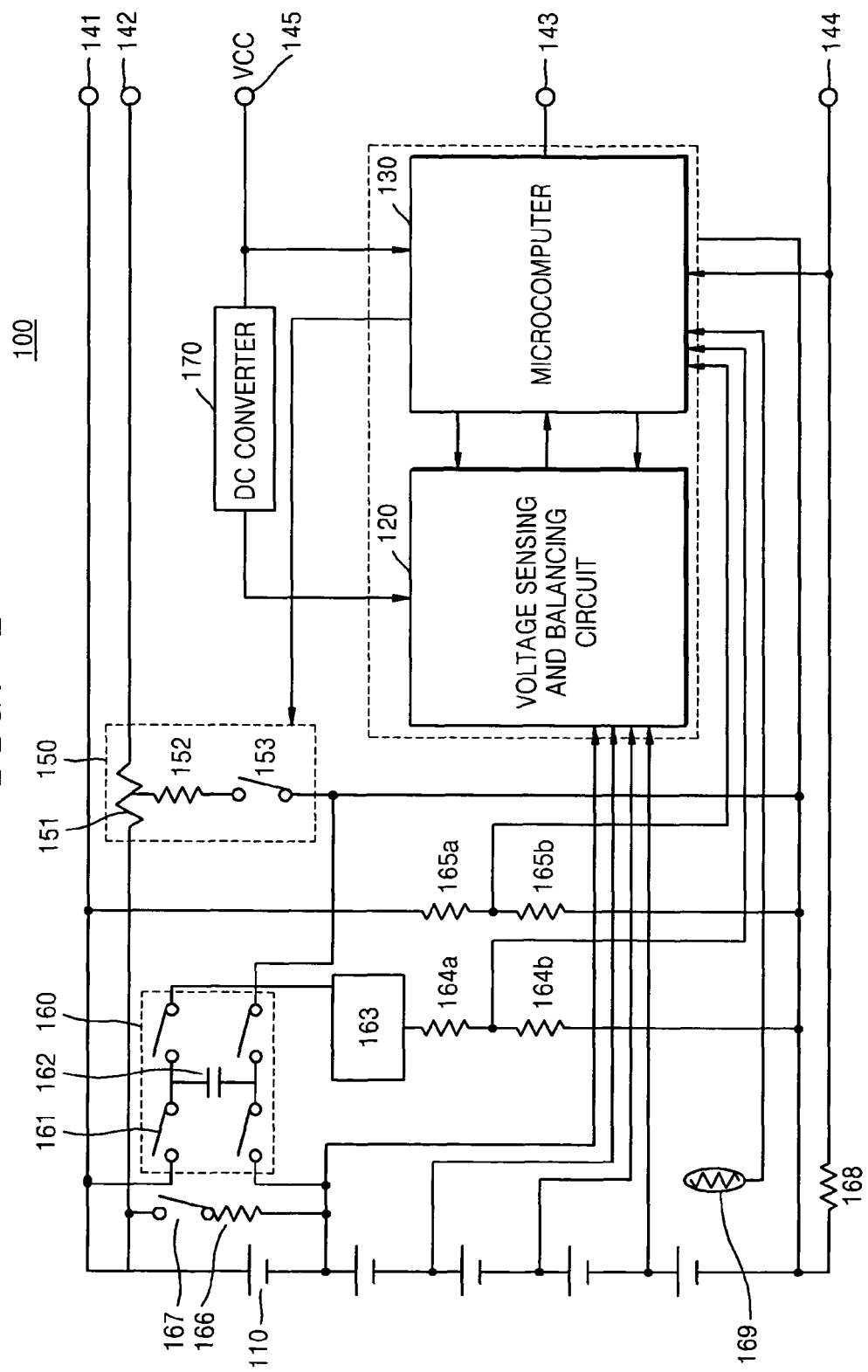
FIG. 1 illustrates a schematic circuit diagram of a battery pack according to an embodiment.

Korean Patent Application No. 10-2009-0112808, filed on Nov. 20, 2009, in the Korean Intellectual Property Office, and entitled: "Battery Pack and Method of Controlling Charging of Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Herein, Markush groups, if any, are identified by the closed language "selected from the group consisting of".

FIG. 1 illustrates a schematic circuit diagram of a battery pack 100 according to an embodiment.

The battery pack 100 may include a rechargeable battery cell 110. In an implementation, as illustrated in FIG. 1, the battery pack 100 may include a plurality of rechargeable battery cells 110, e.g., five rechargeable battery cells 110, that are connected in series. The battery pack 100 may also include a voltage sensing and balancing circuit 120 that simultaneously senses and balances voltages of the battery cells 110, and a microcomputer 130.

In an implementation, each of the battery cells 110 may be a lithium ion battery that may be charged up to about 4.2 V. The voltage sensing and balancing circuit 120 may be configured with analog front-ends for lithium ion batteries. The microcomputer 130 may be configured for lithium ion batteries. The voltage sensing and balancing circuit 120 may sense and transmit voltage information with respect to the four battery cells 110 to an analog-to-digital (A/D) converter of the microcomputer 130. The microcomputer 130 may transmit data processed by a program or an algorithm, e.g., a charge/discharge control signal corresponding to temperature information with regards to, or the voltage information with regards to, the battery cells 110 and a balancing control signal to the voltage sensing and balancing circuit 120. The microcomputer 130 will be described in detail below with reference to FIG. 2.

The battery pack 100 may include a discharging terminal 141 for discharging the battery cells 110, a charging terminal 142 for charging the battery cells 110, a communication terminal 143 for single wire communication with an external device, and a negative electrode terminal 144 for charging or discharging the battery cells 110. The battery pack 100 may further include a power supply terminal 145 for supplying power to the voltage sensing and balancing circuit 120 and the microcomputer 130, and a DC converter 170 for converting a voltage supplied by the power supply terminal 145 and applying the converted voltage to the voltage sensing and balancing circuit 120.

The discharging terminal 141 and the charging terminal 142 may be electrically connected to a positive electrode of the battery cells 110. The negative electrode terminal 144 may be electrically connected to a negative electrode of the battery cells 110. The communication terminal 143 may be electrically connected to the microcomputer 130.

The battery pack 100 may include a charge-blocking unit 150 between the battery cells 110 and the charging terminal 142 for inhibiting overcharge. The charge-blocking unit 150 may include a fuse 151, a heating resistor 152, and a switch 153. The fuse 151 may be connected to the heating resistor 152 and the switch 153, and the switch 153 may be turned on or off by a charge control signal from the microcomputer 130. In another implementation, the charge-blocking unit 150 may be an overcharge-blocking unit or an overcharge-inhibiting member formed of a plurality of field-effect transistors.

As described above, according to the present embodiment, a discharge pathway and a charge pathway may be independently disposed using the discharging terminal 141 and the charging terminal 142. Accordingly, overcharging of the battery cells 110 may be inhibited by the charge-blocking unit 150 during charging. In an implementation, discharging of the battery cells 110 may not be controlled. In an implementation, the battery pack and methods of controlling charging of the battery pack according to embodiments of the present invention may also be applied to a battery pack including the discharging terminal 141 and the charging terminal 142 connected commonly. An overdischarge-blocking switch or an overcharge-blocking switch that include field effect transistors may be used.

The battery pack 100 illustrated in FIG. 1 includes five battery cells 110 connected in series, while the voltage sensing and balancing circuit 120 is designed to sense voltages of four battery cells 110 and to transmit voltage measurements thereof to the microcomputer 130. Sensing a voltage of the fifth battery cell 110 may change the circuit. Thus, the battery pack 100 illustrated in FIG. 1 further includes an analog switch 160, which may be used to sense the voltage of the fifth battery cell 110 and to transmit voltage measurement thereof to the microcomputer 130.

The analog switch 160 may be connected in parallel between a positive electrode and a negative electrode of the fifth battery cell 110. The analog switch 160 may include four switches 161 and a single flying capacitor 162.

In operation, the analog switch 160 charges the flying capacitor 162 with the voltage of the fifth battery cell 110. In addition, the analog switch 160 outputs the voltage stored in the flying capacitor 162 to the microcomputer 130 as the voltage measurement of the fifth battery cell 110. For this, an operational amplifier (OP AMP) 163 and voltage dividing resistors 164a and 164b may further be disposed between the analog switch 160 and the microcomputer 130. In addition, voltage dividing resistors 165a and 165b, which are disposed between the discharging terminal 141 and the negative electrode terminal 144, output a total voltage of the battery pack 100 to the microcomputer 130. The analog switch 160 outputs the voltage of the fifth battery cell 110 charged in the flying capacitor 162 when the switches 161 are turned on or off according to a control signal from the microcomputer 130.

The battery pack 100 may further include a balancing resistor 166 and a balancing switch 167 for balancing the fifth battery cell 110. The balancing resistor 166 and the balancing switch 167 may be electrically connected between the positive electrode and the negative electrode of the fifth battery cell 110. The balancing switch 167 may also be turned on or off by a control signal from the microcomputer 130. Balancing resistors and balancing switches for the rest of the four battery cells 110 may be embedded in the voltage sensing and balancing circuit 120.

It will be appreciated that a balancing method according to the present embodiment is not limited to being applied to only the battery pack 100 including five battery cells 110 connected in series. For example, the balancing method may also be applied to battery packs 100 including three battery cells 110, four battery cells 110, or six battery cells 110 which are connected in series. Based on the number of battery cells 110, the analog switch 160 may not be implemented, more analog switches 160 may be implemented, or a circuit having similar functions may be implemented.

A temperature sensor 169 may sense the temperature of the battery cells 110. According to the present embodiment, the measurement of the temperature may be repeated several times within a predetermined period of time in the same manner. For example, the temperature may be measured six times within 10 seconds. A thermister may be used as the temperature sensor 169. The temperature sensor 169 may output the average of the temperature measurements to the microcomputer 130.

A current sensing resistor 168 may sense a current of a large current pathway in the battery pack 100. The measurement of the current may be repeated several times within a predetermined period of time in the same manner as in the measurement of the temperature. The current sensing resistor 168 may output the average of the current measurements to the microcomputer 130.

Figure 2:
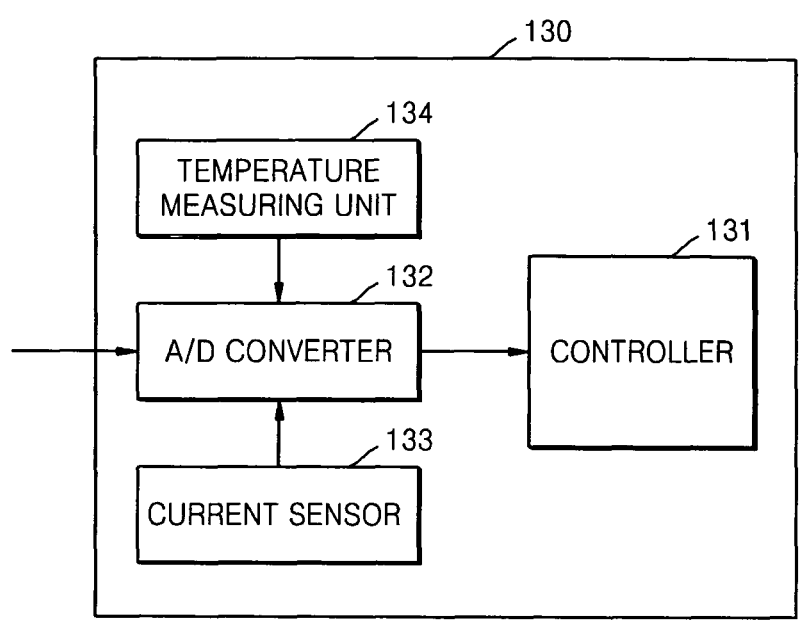
FIG. 2 illustrates a schematic block diagram of a microcomputer shown in FIG. 1.

FIG. 2 illustrates a schematic block diagram of a microcomputer shown in FIG. 1.

Referring to FIG. 2, the microcomputer 130 may include a controller 131, an A/D converter 132, a current sensor 133, and a temperature measuring unit 134.

The controller 131 may control overall operation of the microcomputer 130. The controller 131 may detect abnormal analog-to-digital conversion of the microcomputer 130, and the voltages and the temperature of the battery cells 110, and may output a charge-control signal to the charge-blocking unit 150 based on whether an abnormality is detected to inhibit charging of the battery cells 110. For example, the controller 131 may output a charge-control signal to turn on the switch 153 of the charge-blocking unit 150, and then the heating resistor 152 may blow the fuse 151 to block the charge pathway of the battery cells 110 connected to the charging terminal 142.

The A/D converter 132 may convert analog input values, e.g., analog input values such as voltage measurements, temperature measurements, and current measurements with respect to the battery cells 110, into digital values. For example, referring again to FIG. 1, the voltage measurements with respect to the four battery cells 110 are input by the voltage sensing and balancing circuit 120, and the voltage charged in the flying capacitor 162 is input as the voltage measurement with respect to the fifth battery cell 110.

The A/D converter 132 may convert the temperature measurement with respect to the battery cells 110 input by the temperature sensor 169 into a digital value. The A/D converter 132 may also receive a temperature measurement with respect to the microcomputer 130 measured by the temperature measuring unit 134 in addition to the temperature of the battery cells 110, and convert the temperature measurement with respect to the microcomputer 130 into a digital value.

The A/D converter 132 may also receive the current measurement with respect to heavy current path (HCP) sensed by the current sensor 133 using the current sensing resistor 168, and convert the current measurement into a digital value. An algorithm for detecting abnormal analog-to-digital conversion of the input values into digital values may be provided. It may not be easy to detect abnormal analog-to-digital conversion in the microcomputer 130. Thus, a voltage of a zener diode having a breakdown voltage of, e.g., 2.0V may be input to a front end of the A/D converter 132 and an output thereof is used as an A/D conversion measurement value. The measurement value may be compared with a reference value, which may be a measurement of an initial test output of the A/D converter 132 during the preparation of a printed circuit board assembly (PCBA).

The controller 131 may determine whether a difference between the measurement value and the reference value (recorded during the initial test of the microcomputer 130) is equal to or greater than a first threshold. The first threshold may be set according to the particular application. For example, if the difference is equal to or greater than 0×100, that is, greater than 3 bits, the controller 131 may determine that there is an abnormal operation and output a charge control signal inhibiting charging of the battery pack 100.

The controller 131 may determine whether a difference between a sum of the voltages of the five battery cells 110 and the voltage of the battery pack 100 is equal to or greater than a second threshold. The second threshold may be set according to the particular application. For example, if the difference between the sum of voltages of the battery cell 110 and the voltage of the battery pack 100 is equal to or greater than 100 mV, the controller 131 may determine that there is an abnormal operation and output a charge control signal inhibiting charging of the battery pack 100.

The voltages of the four battery cells 110 may be input by the voltage sensing and balancing circuit 120, and the voltage charged in the flying capacitor 162 may be input as the voltage of the fifth battery cell 110. The voltage input to the microcomputer 130 via the voltage dividing resistors 165a and 165b may be used as the voltage of the battery pack 100.

In order to detect an abnormal cell voltage, a current value may further be considered in addition to the voltage. The controller 131 may determine that the voltage of the battery cells 110 is abnormal when a current measurement from the current sensor 133 is less than a third threshold. The third threshold may be set according to the particular application. For example, if the current measurement is less than 0.5 A, the controller 131 may output a charge control signal to the charge-blocking unit 150.

The temperature sensor 134 may measure the temperature of the microcomputer 130. The controller 131 may determine that the difference between the temperature of the battery cells 110 measured by the battery cell 110 is not identical to the temperature of the microcomputer 130 measured by the temperature measuring unit 134 if a difference in the temperatures is equal to or greater than the fourth threshold. The fourth threshold may be set according to the particular application. For example, if the temperature difference is equal to or greater than 8° C., the controller 131 may determine that the two temperatures are not the same and output a charge control signal inhibiting charging of the battery pack 100.

A temperature change may also be considered in addition to the temperature difference. The controller 131 may determine that the temperatures are not the same if the temperature change for a time period during which the temperature is measured by the microcomputer 130, for example, during 10 seconds, is equal to or less than a fifth threshold. The fifth threshold may be set according to the particular application. For example, if the temperature change during the time period during which the temperature is measured is equal to or less than 3° C., the controller 131 may determine that there is an abnormal operation and output a charge control signal inhibiting charging of the battery pack 100.

The controller 131 may detect an abnormal reference A/D conversion, an abnormal cell voltage, and a difference of temperature for a predetermined period of time, e.g., for 10 seconds. If the abnormal operations based on the measured values are continuously detected several times, e.g., six times, the controller 131 may then inhibit charging of the battery pack 100.

Figure 3:
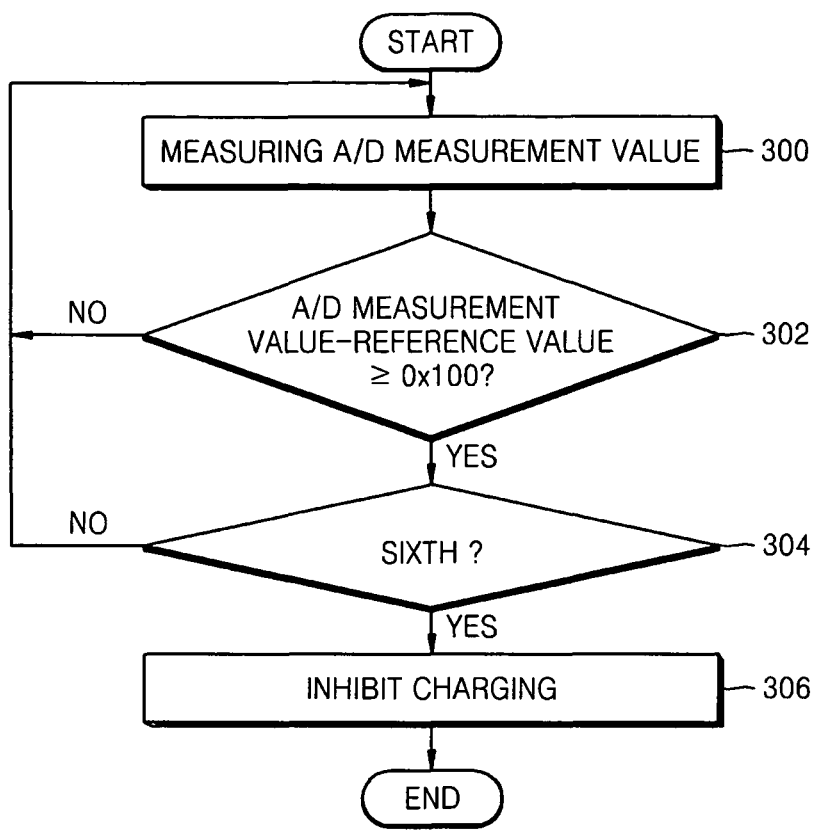
FIG. 3 illustrates a flowchart describing a method of controlling charge of a battery pack according to another embodiment.

FIG. 3 illustrates a flowchart describing a method of controlling charge of the battery pack 100 according to another embodiment, by which an abnormal operation of a reference analog-to-digital conversion is detected and charging of the battery pack 100 is controlled.

Referring to FIG. 3, in operation 300, an A/D conversion value is measured. The A/D conversion value may be measured by inputting a voltage of a zenor diode having a constant breakdown voltage of, for example, 2.0 V, to the A/D converter 132. In operation 302, it is determined whether difference between the measurement and a reference value is equal to or greater than, e.g., 3 bits. The reference value may be obtained by connecting the zenor diode during an initial test of the microcomputer 130. If the difference between the measurement and the reference value is equal to or greater than, e.g., 3 bits in operation 304, it is determined whether this result has been obtained six times in succession in operation 304. If so, charging of the battery pack 100 is inhibited in operation 306. The number of tests (here, six) may be set for safety in accordance with the particular application.

Figure 4:
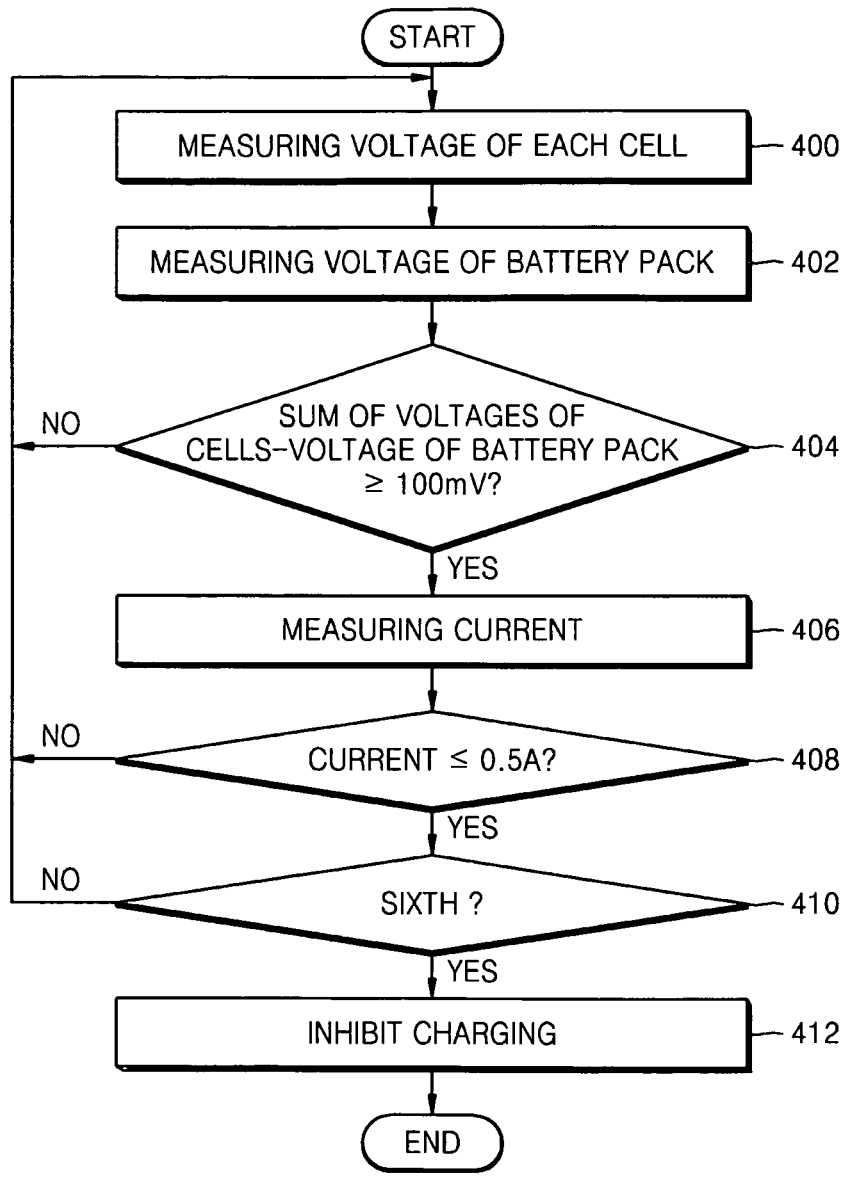
FIG. 4 illustrates a flowchart describing a method of controlling charge of a battery pack according to another embodiment.

FIG. 4 illustrates a flowchart describing a method of controlling charge of the battery pack 100 according to another embodiment, by which abnormal operation of measuring a cell voltage is detected and charging of the battery pack 100 is controlled.

Referring to FIG. 4, in operations 400 and 402, a voltage of each of the battery cells 110 and a voltage of the battery pack 100 are measured. The measuring of the voltages of the battery cells 110 and the battery pack 100 may be simultaneously performed. In operation 404, it is determined whether the difference between the sum of the voltages of the battery cells 110 and the voltage of the battery pack 100 is equal to or greater than, e.g., 100 mV. If the difference is equal to or greater than, e.g., 100 mV, a current is measured in operation 406. If the measured current is equal to or less than, e.g., 0.5 A in operation 408, it is then determined whether the current equal to or less than 0.5 A has been measured six times in succession in operation 410. If so, charging of the battery pack 100 is inhibited in operation 412. If the difference between the sum of the voltages of the battery cells 110 and the voltage of the battery pack 100 is less than, e.g., 100 mV in operation 404, the process returns to operation 400 to measure voltages of the battery cells 110. If the current is greater than 0.5 A in operation 408, the process returns to operation 400 to measure voltages of the battery cells.

FIG. 5 illustrates a flowchart describing a method of controlling charge of the battery pack 100 according to another embodiment, by which difference between temperatures is detected and charging of the battery pack 100 is controlled.

Referring to FIG. 5, in operations 500 and 502, temperature of the battery cells 110 and temperature of the microcomputer 130 are respectively measured. The measuring of the temperatures of the battery cells 110 and the microcomputer 130 may be simultaneously performed. If the difference between the temperature of the battery cell 110 and the temperature of the microcomputer 130 is equal to or greater than, e.g., 8° C. in operation 504, the process moves to operation 506 to determine whether the temperature change during the measurement is equal to or less than, e.g., 3° C. If the temperature change is equal to or less than, e.g., 3° C., it is determined whether the temperature change of equal to or less than, e.g., 3° C. has been detected six times in succession in operation 508. If so, charging of the battery pack 100 is inhibited in operation 510. If operations 504, 506, and 508 are not satisfied, the process returns to operation 500.

Portable electronic devices such as notebook computers and portable electric power tools generally include a rechargeable battery pack. Such a battery pack may include a plurality of battery cells and a battery monitoring unit, which may control overcharge or overdischarge and calculate capacity of the battery pack. A battery pack used in a particular device, such as a portable electric power tool, may not have an overdischarge control unit, i.e., the overdischarge control unit may not be included in the battery pack in order to increase maximum power output. For a battery pack used in electric power tools in which a high current flows, a protective algorithm may be used to make the battery pack safer. However, if the battery pack does not include a field effect transistor (FET) switch, charging and discharging of the battery pack may not be immediately controlled. Thus, the battery pack should be made safer when the battery pack is not functioning properly.

As described above, one or more embodiments relate to a battery pack and a method of controlling charging of the battery pack, which may be applied to, e.g., a battery pack for electric power tools and a method of controlling charging of the battery pack for electric power tools. The battery pack may detect abnormal analog-to-digital conversion of the microcomputer, abnormal voltage, and/or abnormal temperature of the battery cells, and may not allow charging of the battery pack under predetermined conditions so as to protect the battery pack for safety and effective operation. In an implementation, a battery pack for an electric power tool that does not have a charge/discharge switch may also be safely used by not allowing charging of the battery pack under predetermined conditions.

Thus, embodiments may provide a battery pack and a method of controlling charge of the battery pack, where the battery pack detects abnormal analog-to-digital conversion of the microcomputer, abnormal voltage, and/or abnormal temperature of the battery cell, and does not allow charging, i.e., prevents charging, of the battery pack under predetermined conditions so as to protect the battery pack for safety and effective operation.

In addition, other embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as interne transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a battery cell;
a charge-blocking unit;
a voltage sensing and balancing circuit; and
a microcomputer, the microcomputer including a controller configured to detect at least one selected from the group of abnormal analog-to-digital conversion, abnormal voltage, and abnormal temperature of the battery cell, the controller configured to output a charge control signal to the charge-blocking unit to inhibit charging of the battery cell, wherein:
the microcomputer further includes an analog-to-digital (A/D) converter that converts analog voltage, temperature, and current measurements from the battery cell into digital output values, and
the controller outputs a charge control signal to the charge-blocking unit if the difference between a measurement value obtained by inputting a voltage of a zener diode to the A/D converter and a reference value recorded during an initial test of the microcomputer is equal to or greater than a first threshold.

2. The battery pack as claimed in claim 1, wherein the charge-blocking unit includes a fuse disposed between the battery cell and a charging terminal for inhibiting overcharge, a heating resistor for blowing the fuse, and a switch that is turned on or off according to the charge control signal output by the controller.

3. The battery pack as claimed in claim 1, wherein the battery pack is an electric power tool battery pack.

4. A battery pack, comprising:
a battery cell;
a charge-blocking unit;
a voltage sensing and balancing circuit; and
a microcomputer, the microcomputer including a controller configured to detect at least one selected from the group of abnormal analog-to-digital conversion, abnormal voltage, and abnormal temperature of the battery cell, the controller configured to output a charge control signal to the charge-blocking unit to inhibit charging of the battery cell, wherein:
the battery pack includes a plurality of battery cells, and
the controller outputs a charge control signal to the charge-blocking unit if a difference between a sum of voltages of the plurality of battery cells and a voltage of the battery pack is equal to or greater than a second threshold.

5. The battery pack as claimed in claim 4, wherein:
the microcomputer further includes a current measuring unit, and
the controller outputs a charge control signal to the charge-blocking unit if the difference between the sum of voltages of each of the plurality of battery cells and the voltage of the battery pack is equal to or greater than a second threshold, and the measured current is equal to or less than a third threshold.

6. The battery pack as claimed in claim 4, wherein the charge-blocking unit includes a fuse disposed between the battery cell and a charging terminal for inhibiting overcharge, a heating resistor for blowing the fuse, and a switch that is turned on or off according to the charge control signal output by the controller.

7. The battery pack as claimed in claim 4, wherein the battery pack is an electric power tool battery pack.

8. A battery pack, comprising:
a battery cell;
a charge-blocking unit;
a voltage sensing and balancing circuit; and
a microcomputer, the microcomputer including a controller configured to detect at least one selected from the group of abnormal analog-to-digital conversion, abnormal voltage, and abnormal temperature of the battery cell, the controller configured to output a charge control signal to the charge-blocking unit to inhibit charging of the battery cell, wherein:
the microcomputer further includes a temperature measuring unit for measuring the temperature of the microcomputer, and
the controller outputs a charge control signal to the charge-blocking unit if a difference between the temperature of the battery cell and the temperature of the microcomputer is equal to or greater than a fourth threshold.

9. The battery pack as claimed in claim 8, wherein the controller outputs a charge control signal to the charge-blocking unit if the difference between the temperature of the battery cell and the temperature of the microcomputer is equal to or greater than the fourth threshold, and a temperature change within a time period during which the temperature is measured is equal to or less than a fifth threshold.

10. The battery pack as claimed in claim 8, wherein the charge-blocking unit includes a fuse disposed between the battery cell and a charging terminal for inhibiting overcharge, a heating resistor for blowing the fuse, and a switch that is turned on or off according to the charge control signal output by the controller.

11. The battery pack as claimed in claim 8, wherein the battery pack is an electric power tool battery pack.

12. A battery pack, comprising:
a battery cell;
a charge-blocking unit;
a voltage sensing and balancing circuit; and
a microcomputer, the microcomputer including a controller configured to detect at least one selected from the group of abnormal analog-to-digital conversion, abnormal voltage, and abnormal temperature of the battery cell, the controller configured to output a charge control signal to the charge-blocking unit to inhibit charging of the battery cell, wherein the controller detects, at least twice, at least one selected from the group of abnormal analog-to-digital conversion of the microcomputer, abnormal voltage, and abnormal temperature of the battery cells.

13. The battery pack as claimed in claim 12, wherein the charge-blocking unit includes a fuse disposed between the battery cell and a charging terminal for inhibiting overcharge, a heating resistor for blowing the fuse, and a switch that is turned on or off according to the charge control signal output by the controller.

14. The battery pack as claimed in claim 12, wherein the battery pack is an electric power tool battery pack.

* * * * *